UNITED STATES PATENT OFFICE.

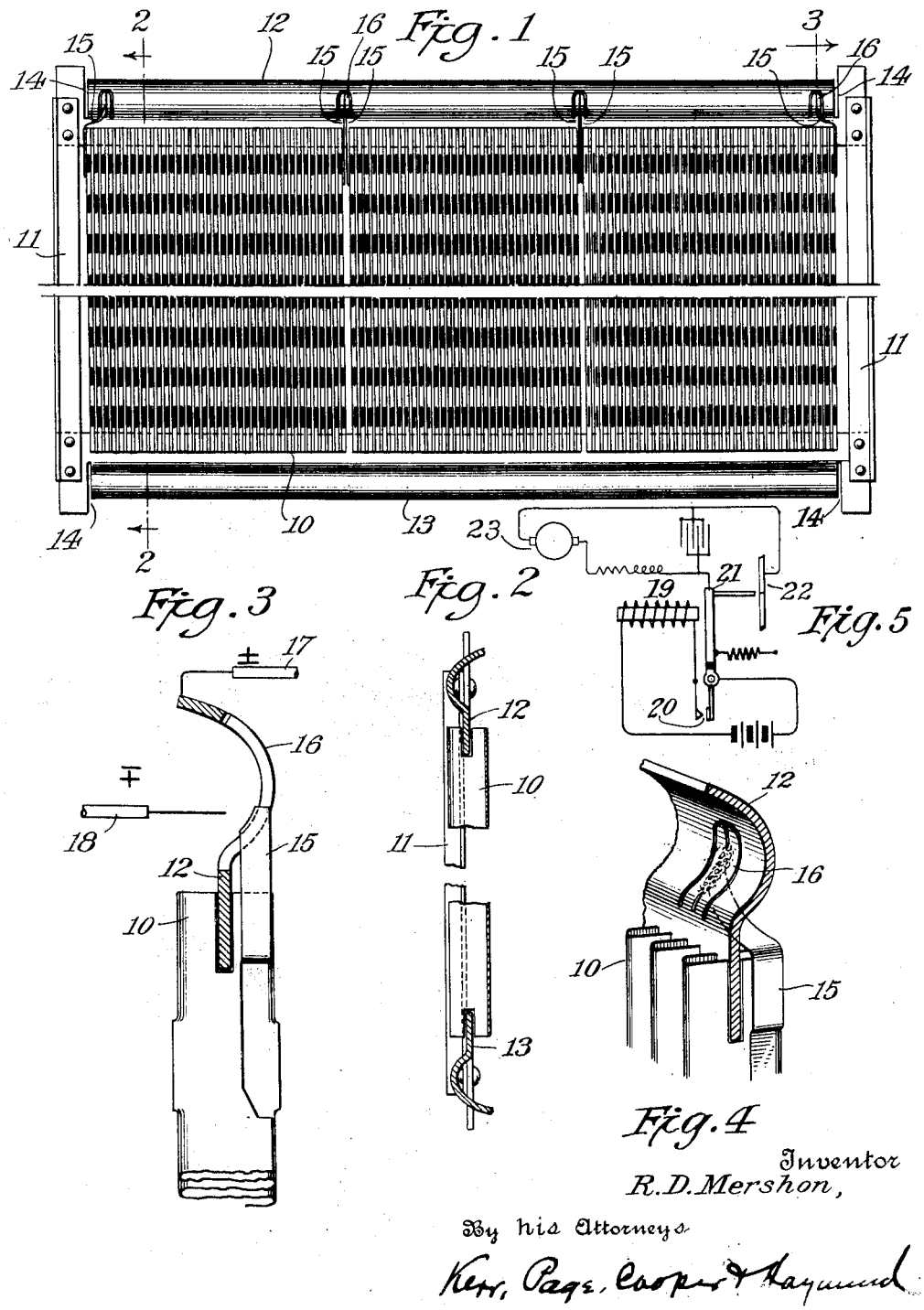

RALPH D. MERSHON, OF NEW YORK, N. Y.

WELDING METALS.

1,269,726.

Specification of Letters Patent.  Patented June 18, 1918.

Application filed April 3, 1917.  Serial No. 159,393.

*To all whom it may concern:*

Be it known that I, RALPH D. MERSHON, a citizen of the United States, residing at New York, county and State of New York, have invented certain new and useful Improvements in Welding Metals, of which the following is a full, clear, and exact description.

In my copending application Serial No. 159,146 filed April 2, 1917, I have described an electrode for use in electrolytic rectifiers, condensers, and other electrolytic apparatus composed of a crimped sheet of thin sheet-metal mounted in a stiff supporting frame, also of metal. In this electrode the crimped plate or sheet is provided with terminals which are welded to the supporting frame so that connection can be conveniently made from the latter to the external circuit.

The metal preferably used for the crimped plate is aluminum, since that metal not only possesses the necessary properties but is also inexpensive. It is, however, difficult to weld aluminum, even when the parts to be welded are of substantial thickness and mechanical strength, and when one of the parts is thin sheet metal, not much thicker than heavy foil, the welding cannot be effected by any prior method with which I am familiar.

I was therefore led to devise the invention that forms the subject of the present application, the chief object of which is to provide a simple and effective method for welding sheet metal, fine wires, and the like. It should be understood, however, that the invention is not limited to such use, but can be employed to advantage in various situations where other methods are for one reason or another impracticable, especially for welding parts that are already in electrical contact or connection with each other.

Referring to the accompanying drawing, Figure 1 is an elevation of an electrode of the type mentioned, consisting of a crimped sheet-metal plate mounted in and encircled by a stiff supporting frame.

Fig. 2 is a section on line 2—2 of Fig. 1.

Fig. 3 is a detail section on line 3 of Fig. 2.

Fig. 4 is a detail perspective view showing the terminal of the sheet-metal plate welded to the supporting frame.

Fig. 5 is a diagrammatic view illustrating a welding device for practising my method.

The "plate" 10 is composed of sheet metal crimped or folded as clearly shown in Fig. 3 so as to afford large superficial area in proportion to the space occupied by the electrode. The sheet metal used for the purpose is preferably quite thin, a thickness of a few thousandths of an inch being sufficient. The supporting frame, which surrounds the crimped plate, is composed of angle-bar side pieces 11 and upper and lower cross members 12, 13. The inner edges of the latter, that is, the lower edge of member 12 and the upper edge of member 13, are seated in grooves in the edges of the crimped plate, running across the crimps or folds thereof, as shown in Figs. 2, 3 and 4. The plate is thus held in the frame, and at the same time the cross members serve as transverse reinforcements to stiffen the plate against tendency to bend transversely. To give these members additional stiffness, slots 14 are cut at each end and the intermediate portions are bent as shown in Fig. 2. By improved methods of manufacture I am able to put more than twenty square feet of sheet metal into a frame one foot square. The sheet metal may be all in one piece, but it is more conveniently handled in several pieces, for instance three, forming three parts or sections in the finished plate, as shown in Fig. 1.

In using my present invention in the preferred manner to make a continuous metallic connection between the crimped plate and the supporting frame, I first provide the plate, or each section thereof if it is composed of sections, with a suitable terminal, as for example by cutting a strip 15 out of the final fold at one or both sides of each section. To hold these terminal strips in contact with the supporting frame so that they can be welded thereto, the upper cross member is slotted to form tongues 16, and the latter are slit lengthwise to receive the ends of the terminal strips 15 which are bent upwardly for that purpose as shown in Fig. 3. The tongues 16 are not strictly necessary but they are advantageous in that they hold the strips securely yet can be spread to open the slits and so permit easy insertion of the strips. Also, in the subsequent welding operation they tend to localize the heat by lessening the conduction along the cross member.

The strips 15 being held in contact with the appropriate member of the supporting frame, the latter is connected to a terminal 17 of an electrical condenser (not shown) of suitable capacity, or other source of current capable of instantaneous discharge. It is of course immaterial which terminal is connected to the frame, and as indicative of the fact I have marked the terminal 17 with both the signs, positive and negative. The condenser being sufficiently charged, its other terminal 18, is brought into contact with the parts at the point where they are to be welded. Just before the instant of contact the discharge begins, thereby producing a spark. This spark is of a very high temperature and is concentrated upon a very small surface, and hence is sufficient to fuse the metal of the strip 15 and tongue 16 at the point where the discharge recurs. In all cases, so far as I know, material from the terminal 18 is deposited upon the joint. If it is desired not to contaminate the joint with foreign material, the welding point or terminal 18 should be of the same metal as the parts to be welded. It also appears to be necessary to have the welding point come quickly into contact with the parts to be welded, preferably striking the parts a smart blow. The condenser is now recharged and the operation repeated, as often as may be necessary to give a weld of the desired extent. The amount of metal fused at any one instant being quite small, the welded joint is generally rough, as indicated in Fig. 4, instead of smooth like a soldered joint.

If desired, the repeated application of the terminal of the condenser or other source to the point where the weld is to be made can be effected by automatic means, which means can be electro-mechanical or wholly mechanical in character. For instance a simple scheme such as is illustrated diagrammatically in Fig. 5 can be employed. In this device the magnet 19 is alternately energized and deënergized by the make and break of the circuit at the contacts 20 in the well understood way. One terminal of the source of welding current is connected to the vibrating hammer 21 and the other terminal is connected to the parts to be welded, represented in the figure by two rods or wires 22 arranged end to end. As the hammer vibrates, it makes repeated contact with the work and so causes repeated discharges between the work and the hammer. Between blows of the hammer the condenser is recharged from the source 23. For many purposes such a welding device can be made small and light enough to be used as a hand tool.

It is to be understood that the invention is not limited to the precise details herein described.

I claim:—

1. The method of welding herein described, comprising holding the parts together in the position in which they are to be united, connecting them to one terminal of a charged condenser, and then bringing the other terminal of the source into sudden contact with said parts, whereby the parts to be welded are subjected simultaneously to the heat of the discharge from said source and to the impact of the welding terminal.

2. The method of welding herein described, comprising holding the parts together in the position in which they are to be united, connecting them to one terminal of a charged condenser, and bringing the other terminal into contact with the parts at their point of juncture, whereby the heat of the resulting discharge and the impact of the welding terminal fuses together the contacting surfaces of the parts, and repeating the last step until the welding is complete.

3. The method of welding herein described, comprising holding the articles together in contact with each other, connecting them to one terminal of a charged condenser, and striking rapidly recurrent blows with the other terminal upon the parts at the point where they are to be welded, the condenser being re-charged between successive blows of the welding terminal.

In testimony whereof I hereunto affix my signature.

RALPH D. MERSHON.